(12) United States Patent
Kurosaki (10) Patent No.: US 12,103,400 B2
(45) Date of Patent: Oct. 1, 2024

(54) IN-WHEEL MOTOR INCLUDING A TORQUE LIMITER FOR LIMITING A TORQUE BETWEEN A ROTOR COVER AND A CONNECTION MEMBER

(71) Applicant: TOYOTA JIDOSHA KABUSHIKI KAISHA, Toyota (JP)

(72) Inventor: Shin Kurosaki, Toki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 346 days.

(21) Appl. No.: 17/654,882

(22) Filed: Mar. 15, 2022

(65) Prior Publication Data

US 2022/0297529 A1 Sep. 22, 2022

(30) Foreign Application Priority Data

Mar. 17, 2021 (JP) .................. 2021-043166

(51) Int. Cl.
*H02K 1/30* (2006.01)
*B60K 7/00* (2006.01)
(Continued)

(52) U.S. Cl.
CPC ............ *B60K 7/0007* (2013.01); *H02K 1/30* (2013.01); *H02K 7/003* (2013.01); *H02K 7/006* (2013.01); *H02K 7/116* (2013.01); *B60K 2007/0038* (2013.01); *B60K 2007/0092* (2013.01)

(58) Field of Classification Search
CPC ....... H02K 1/187; H02K 1/2786–2789; H02K 1/279; H02K 1/2791; H02K 1/27915;
(Continued)

(56) References Cited

U.S. PATENT DOCUMENTS 3,312,121 A * 4/1967 Lewis .................... G05G 13/00
74/625
2011/0144848 A1 6/2011 Yoshizue et al.

FOREIGN PATENT DOCUMENTS

JP 08099644 A * 4/1996
JP 11-118003 A 4/1999
(Continued)

OTHER PUBLICATIONS

Shiraki, machine translation of jp2021013245, Feb. 2021 (Year: 2021).*

(Continued)

*Primary Examiner* — Eric Johnson
(74) *Attorney, Agent, or Firm* — Oblon, McClelland, Maier & Neustadt, L.L.P.

(57) ABSTRACT

An in-wheel motor in which a torque will not be applied excessively to a rotor and a wheel, and in which an axial length is reduced. In the in-wheel motor, a rotor is arranged around the stator, and torque is transmitted between a drive member rotated integrally with the rotor and a driven member rotated integrally with a wheel through a transmission member. The transmission member is adapted to allow the drive member and the driven member to rotate relatively to each other when an extraordinary torque is applied to the drive member or the driven member, thereby restricting the torque transmitted between the drive member and the driven member to a predetermined magnitude.

3 Claims, 5 Drawing Sheets

(51) Int. Cl.
*H02K 7/00* (2006.01)
*H02K 7/116* (2006.01)

(58) Field of Classification Search
CPC ...... H02K 1/2792; H02K 7/003; H02K 7/006; H02K 21/22; H02K 21/222; H02K 21/225; H02K 21/227; H02K 1/30; B60K 7/0007; B60K 2007/0038; B60K 2007/0092; B60L 2220/44; B60L 2220/46
See application file for complete search history.

(56) References Cited

FOREIGN PATENT DOCUMENTS

| | | | |
|---|---|---|---|
| JP | 3699371 B2 | | 9/2005 |
| JP | 2005253249 A | * | 9/2005 |
| JP | 2010-047121 A | | 3/2010 |
| JP | 2012192766 A | * | 10/2012 |
| JP | 2016-130572 A | | 7/2016 |
| JP | 2020-01 4303 A | | 1/2020 |
| JP | 2021013245 A | * | 2/2021 |

OTHER PUBLICATIONS

Inagaki, machine translation of jp08099644, Apr. 1996 (Year: 1996).*
Nagato, machine translation of jp2005253249, Sep. 2005 (Year: 2005).*
Yamanaka, machine translation of jp2012192766, Oct. 2012 (Year: 2012).*

* cited by examiner

FIG. 1

INBOARD ← → OUTBOARD

IN-WHEEL MOTOR INCLUDING A TORQUE LIMITER FOR LIMITING A TORQUE BETWEEN A ROTOR COVER AND A CONNECTION MEMBER

CROSS-REFERENCE TO RELATED APPLICATIONS

The present disclosure claims the benefit of Japanese Patent Application No. 2021-043166 filed on Mar. 17, 2021 with the Japanese Patent Office, the disclosure of which are incorporated herein by reference in its entirety.

BACKGROUND

Field of the Disclosure

Embodiments of the present disclosure relate to the art of an in-wheel motor that is arranged in a vehicular wheel.

Discussion of the Related Art

In a conventional inner-rotor type in-wheel motor, an annular stator is joined to a housing supported by a vehicle body, and a rotor is arranged in radially inner side of the stator while maintaining a predetermined clearance therebetween. In the in-wheel motor of this kind, an output shaft is connected to a wheel though a transmission device such as a speed reducer. In order to protect the in-wheel motor and the speed reducer from a load applied from the wheel, the in-wheel motor is provided with a torque limiter.

One example of the in-wheel motor of this kind is described in JP-A-2016-130572. In the in-wheel motor described in JP-A-2016-130572, an output shaft of the motor is joined to a reduction gear pair, and a cylindrical shaft is formed on an output gear of the reduction gear pair. In the cylindrical shaft, a plurality of grooves are formed on a rear end at regular intervals. A wheel hub to which a wheel is attached is arranged coaxially with the cylindrical shaft, and a plurality of ridges are formed on the wheel hub to be engaged with the grooves of the cylindrical shaft. According to the teachings of JP-A-2016-130572, strength of the ridges is set such that the ridges will be broken by an extraordinary load applied from the wheel. That is, in the in-wheel motor taught by JP-A-2016-130572, the ridges serve as a torque limiter.

Another example of the in-wheel motor is described in JP-A-2010-47121. In the in-wheel motor described in JP-A-2010-47121, a torque of the motor is delivered to a hollow transmission shaft through a reduction gear pair, and the transmission shaft is connected to a wheel through a planetary gear set serving as a speed reducer. According to the teachings of JP-A-2010-47121, a weakened portion is formed in the transmission shaft. Specifically, the weakened portion is thinner than the remaining portion, or made of material weaker than that of the remaining portion. In the in-wheel motor described in JP-A-2010-47121, therefore, the weakened portion of the transmission shaft will be broken by an extraordinary load applied from the wheel. Thus, the weakened portion of the transmission shaft described in JP-A-2010-47121 serve as a torque limiter.

Still another example of the in-wheel motor is described in JP-A-2020-14303. In the in-wheel motor as an outer-rotor type motor described in JP-A-2020-14303, an annular stator is connected to a housing, and a rotor is arranged around the stator while maintaining a predetermined clearance therebetween. The rotor is fixed onto a shaft extending along a rotational center through a hub, and a wheel is attached to the shaft. In order to control frequency and current value of an alternate current applied to a coil wound around the stator, an inverter is arranged inside of the stator.

As described, in the in-wheel motor taught by JP-A-2016-130572, a joining site between the rotary members of the motor and the wheel is adapted to serve as a torque limiter. Whereas, in the in-wheel motor taught by JP-A-2010-47121, the transmission shaft that transmits the torque from the motor to the wheel comprises the weakened portion. That is, in the in-wheel motors taught by JP-A-2016-130572 and JP-A-2010-47121, the motor, an input member that transmits the torque of the motor, the torque limiter, and an output member are aligned coaxially along a rotational axis. In the in-wheel motor of this kind, it is necessary to ensure a site to form the torque limiter in the axial direction, and consequently a shaft length of the motor has to be elongated.

SUMMARY

Aspects of embodiments of the present disclosure have been conceived noting the foregoing technical problems, and it is therefore an object of the present disclosure to provide an in-wheel motor in which a torque will not be applied excessively to a rotor and a wheel, and in which an axial length is reduced.

According to the exemplary embodiment of the present disclosure, there is provided an in-wheel motor in which an outer-rotor type motor is arranged in a wheel, comprising: a cylindrical stator; a cylindrical rotor that is arranged around the stator while maintaining a predetermined clearance from an outer circumferential surface of the stator; a drive member that is rotated integrally with the rotor; a driven member that is rotated integrally with the wheel; and a transmission member that transmits a torque between the drive member and the driven member. In order to achieve the above-explained objective, according to the exemplary embodiment of the present disclosure, the transmission member is adapted to allow the drive member and the driven member to rotate relatively to each other when a torque greater than a predetermined magnitude is applied to any one of the drive member and the driven member, thereby restricting the torque transmitted between the drive member and the driven member to the predetermined magnitude.

In a non-limiting embodiment, the transmission member may overlap with the stator at least partially in an axial direction of the wheel.

In a non-limiting embodiment, the transmission member may be situated radially inner side of the stator.

In a non-limiting embodiment, the transmission member is integrated with any one of the drive member and the driven member, and contacted with the other one of the drive member and the driven member in a rotational direction thereby transmitting the torque to the other one of the drive member and the driven member.

In a non-limiting embodiment, the transmission member may be adapted to be broken by the torque greater than the predetermined magnitude being transmitted between the drive member and the driven member.

In a non-limiting embodiment, the drive member may be shaped into an annular member, and the driven member may be shaped into an annular member comprising a connection wall expanding radially outwardly that is contacted with a side wall of the drive member. In addition, the connection wall of the driven member and the side wall of the drive member may be joined to each other through the transmission member.

In a non-limiting embodiment, the drive member may be shaped into an annular member, and the driven member may comprise a joint section that is contacted with an inner circumferential surface of the drive member. In addition, a key may be formed on any one of the inner circumferential surface of the drive member and an outer circumferential surface of the joint section of the driven member, and a keyway to which the key is inserted may be formed on the other one of the inner circumferential surface of the drive member and the outer circumferential surface of the joint section of the driven member. In this case, the key may serve as the transmission member.

In a non-limiting embodiment, the drive member and the driven member may be joined to each other through the transmission member, and a predetermined clearance may be maintained between the transmission member and any one of the drive member and the drive member in a rotational direction of the rotor.

In a non-limiting embodiment, the drive member and the driven member may be joined to each other through the transmission member, and the transmission member may be contacted tightly to the drive member and the driven member in the rotational direction of the rotor.

In a non-limiting embodiment, the transmission member may include a friction member that is interposed between the drive member and the driven member to transmit the torque frictionally therebetween.

In a non-limiting embodiment, the transmission member may be adapted to cause a slip between the drive member and the driven member when the torque greater than the predetermined magnitude is transmitted between the drive member and the driven member.

In a non-limiting embodiment, the drive member may be shaped into an annular member, and the driven member may comprise a joint section that is contacted with an inner circumferential surface of the drive member. In this case, a contact site between the inner circumferential surface of the drive member and an outer circumferential surface of the joint section of the driven member may serve as the transmission member.

In a non-limiting embodiment, any one of the drive member and the driven member may comprise a pair of plate members arranged on both sides of a radially inner end of the drive member or a radially outer end of the driven member in an axial direction of the rotor. In this case, a contact site between the plate members and the drive member or the driven member may serve as the transmission member.

In a non-limiting embodiment, the in-wheel motor may further comprise an elastic member that pushes any one of the plate members toward the other one of the plate members.

Thus, the in-wheel motor according to the exemplary embodiment of the present disclosure is an outer-rotor type motor in which the rotor is arranged around the stator. In the in-wheel motor according to the exemplary embodiment of the present disclosure, a torque limiter is arranged in an output side of the rotor so that the drive member and the driven member are allowed to rotate relatively to each other when an extraordinary torque is applied to any one of the drive member and the driven member. According to the exemplary embodiment of the present disclosure, therefore, the torque transmitted between the drive member and the driven member may be restricted to the predetermined magnitude. In addition, in the in-wheel motor according to the exemplary embodiment of the present disclosure, a motor section generating a torque is arranged concentrically with a transmission section transmitting the torque to the wheel. According to the exemplary embodiment of the present disclosure, therefore, an axial length of the in-wheel motor may be reduced.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
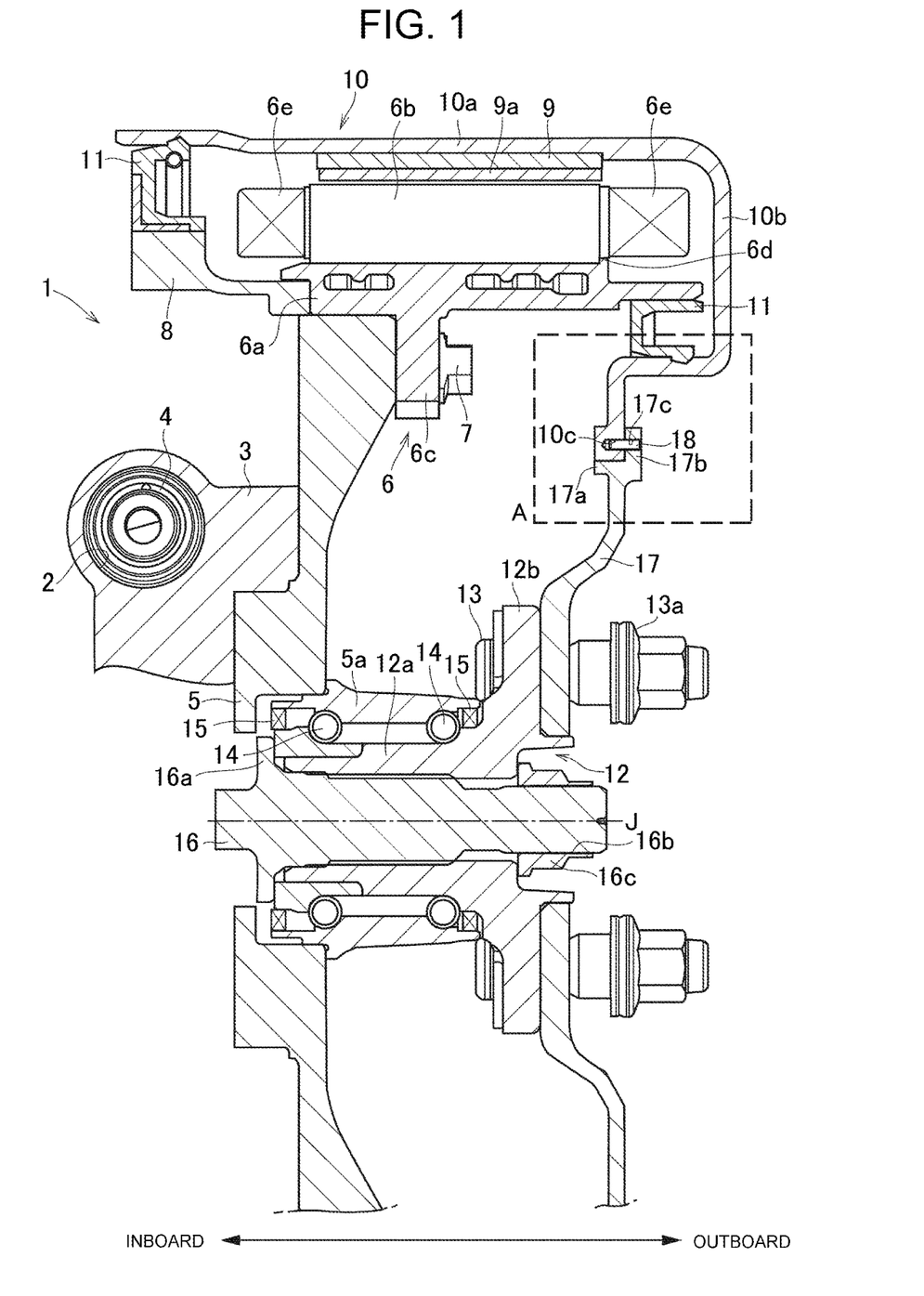
FIG. 1 is a cross-sectional view showing a cross-section of the in-wheel motor according to a first example of the present disclosure.

An exemplary embodiment of the present disclosure will now be explained with reference to the accompanying drawings. Referring now to FIG. 1, there is shown a cross-section of the in-wheel motor 1 according to the first example of the present disclosure. As illustrated in FIG. 1, the in-wheel motor 1 comprises a retainer 3 having a through hole 2, and a damper mechanism 4 such as a suspension and a shock absorber is inserted into the through hole 2. That is, the in-wheel motor 1 is supported by a vehicle body (not shown) through the damper mechanism 4.

A knuckle 5 having a rectangular cross-section is joined to an axially outer surface (in an outboard side) of the retainer 3 so that the retainer 3 and the knuckle 5 are allowed to pivot integrally around the damper mechanism 4.

A cylindrical stator 6 is arranged around the knuckle 5 while being connected to the knuckle 5. According to the first example, the stator 6 comprises: a cylindrical base section 6a formed around a center axis J of a wheel; a cylindrical stator yoke 6b fitted onto an outer circumferential surface of the base section 6a; and an annular installation section 6c formed on an inner circumferential surface of the base section 6a. According to the first example, in order to cool the stator 6, a hollow space is formed in the base section 6a to flow cooling medium therethrough.

The stator yoke 6b comprises a plurality of annular steel sheet layers, and may be fitted onto the base section 6a through a spline or by shrink fitting. Specifically, the stator yoke 6b is fitted onto the base section 6a from one of axial directions (i.e., from the left side in FIG. 1), and positioned by a flange 6d protrudes radially outwardly from the base section 6a at an outboard side. As an option, in the case of fitting the stator yoke 6*b* onto the base section 6*a* through a spline, an axially inner end of the stator yoke 6*b* (i.e., an end portion in an inboard side) may be fixed by a stopper member such as a snap ring.

A plurality of stator teeth (not shown) are formed on an outer circumferential surface of the stator yoke 6*b* at regular intervals in the circumferential direction, and a coil 6*e* is wound around each of the stator teeth. An axially inner surface of the installation section 6*c* (i.e., a surface of the installation section 6*c* in the inboard side) is in contact with an opening end of the knuckle 5, and the installation section 6*c* is fixed by a bolt 7 from the outboard side. According to the first example, a cylindrical shaft 8 is formed integrally with the knuckle 5, and an end portion of the stator yoke 6*b* in the inboard side is in contact with the cylindrical shaft 8. In the in-wheel motor 1 shown in FIG. 1, the coils 6*e* are cooled by an airflow created in a rotor cover 10 by a rotation of a rotor 9.

The rotor 9 as a cylindrical member is arranged around the stator 6 while maintaining a predetermined clearance from the outer circumferential surface of the stator 6. That is, the in-wheel motor 1 shown in FIG. 1 is an outer-rotor type motor. Specifically, the rotor 9 comprises a plurality of annular steel sheet layers, and a plurality of permanent magnets 9*a* arranged on an inner circumferential surface of the rotor 9 while being regularly spaced in the circumferential direction.

The rotor cover 10 as a drive member is fitted onto the rotor 9 through a spline or by shrink fitting so that the rotor 9 rotates integrally with the rotor cover 10. Specifically, the rotor cover 10 shown in FIG. 1 comprises a cylindrical section 10*a* engaged with the rotor 9, and an annular side wall section 10*b* expanding radially inwardly from an and portion of the cylindrical section 10*a* in the outboard side. That is, an inner circumferential surface of the rotor cover 10 is fitted onto the rotor 9 through a spline or by shrink fitting to be rotated integrally with the rotor 9.

According to the first example, an inner diameter of the cylindrical section 10*a* is larger at a portion fitted onto the rotor 9 than that of a portion of the outboard side of the rotor 9. That is, a step is formed on the inner circumferential surface of the cylindrical section 10*a* so that the rotor cover 10 is positioned by the step after fitted onto the rotor 9. As an option, in the case of fitting the rotor cover 10 onto the rotor 9 through a spline, an axially inner end of the rotor 9 (i.e., an end portion in the inboard side) may be fixed by a stopper member such as a snap ring.

In the rotor cover 10, specifically, a leading end of the cylindrical section 10*a* is aligned with a leading end of the cylindrical shaft 8 in the inboard side, and a sealing member 11 is interposed between the inner circumferential surface of the cylindrical section 10*a* and an outer circumferential surface of the cylindrical shaft 8 to prevent intrusion of foreign matter.

The side wall section 10*b* of the rotor cover 10 expands radially inwardly while maintaining a predetermined clearance from the coils 6*e* and the base section 6*a* of the stator 6, and bent toward the inboard side in the radially inner side of the base section 6*a* to form an inner cylindrical section. In order to prevent intrusion of foreign matter, another sealing member 11 is interposed between the inner cylindrical section of the rotor cover 10 and the base section 6*a* of the stator 6. The inner cylindrical section of the side wall section 10*b* is bent radially inwardly at the axially inner side of another sealing member 11. Thus, a radially inner end section of the side wall section 10*b* is situated radially inner side of the stator 6, and overlaps at least partially with the stator 6 in the axial direction. In addition, a radially inner end of the side wall section 10*b* is thicker than the remaining portion of the side wall section 10*b*, and a pinhole 10*c* having a circular cross-section is formed on the radially inner end of the side wall section 10*b* to open toward the outboard side.

An inner circumference of the knuckle 5 is joined to a cylindrical member 5*a* extending axially outwardly, and a hollow support shaft 12 is held in a hollow space of the cylindrical member 5*a* while being allowed to rotate relatively to the cylindrical member 5*a*. The support shaft 12 comprises a cylindrical section 12*a* that is inserted into the hollow space of the cylindrical member 5*a*, and a flange 12*b* expanding around a leading end of the cylindrical section 12*a* in the outboard side. The flange 12*b* of the support shaft 12 is fixed to a wheel (not shown) by screwing a nut onto a thread 13*a* of a rivet 13.

Rollers 14 are interposed between the cylindrical member 5*a* and the cylindrical section 12*a* of the support shaft 12 to receive a radial road and an axial road acting between the cylindrical member 5*a* and the cylindrical section 12*a*. That is, the cylindrical member 5*a* as an outer race and the cylindrical section 12*a* as an inner race serves as an angular ball bearing. Sealing members 15 are interposed between the cylindrical member 5*a* and the cylindrical section 12*a* on both sides of the rollers 14 in the axial direction, and a rotary shaft 16 is inserted into a hollow space of the support shaft 12. In the rotary shaft 16, a flange 16*a* is formed on axially inner side of the roller 14 arranged in the inboard side, and thread 16*b* is formed on axially outer side of the roller 14 arranged in the outboard side. A nut 16*c* is screwed onto the thread 16*b* so that an outer circumferential edge of the nut 16*c* comes into contact with the support shaft 12 to fix a position of the support shaft 12. Consequently, positions of the stator 6 and the rotor 9 are fixed.

The rotor cover 10 fitted onto the rotor 9 is connected to the flange 12*b* of the support shaft 12 through an annular connection member 17 as a driven member. Specifically, an axially inner surface of the connection member 17 is in contact with the flange 12*b*, and the connection member 17 is fixed to the support shaft 12 by the rivet 13 penetrating through the flange 12*b* and the connection member 17. That is, the connection member 17 is rotated integrally with the wheel.

Figure 2:
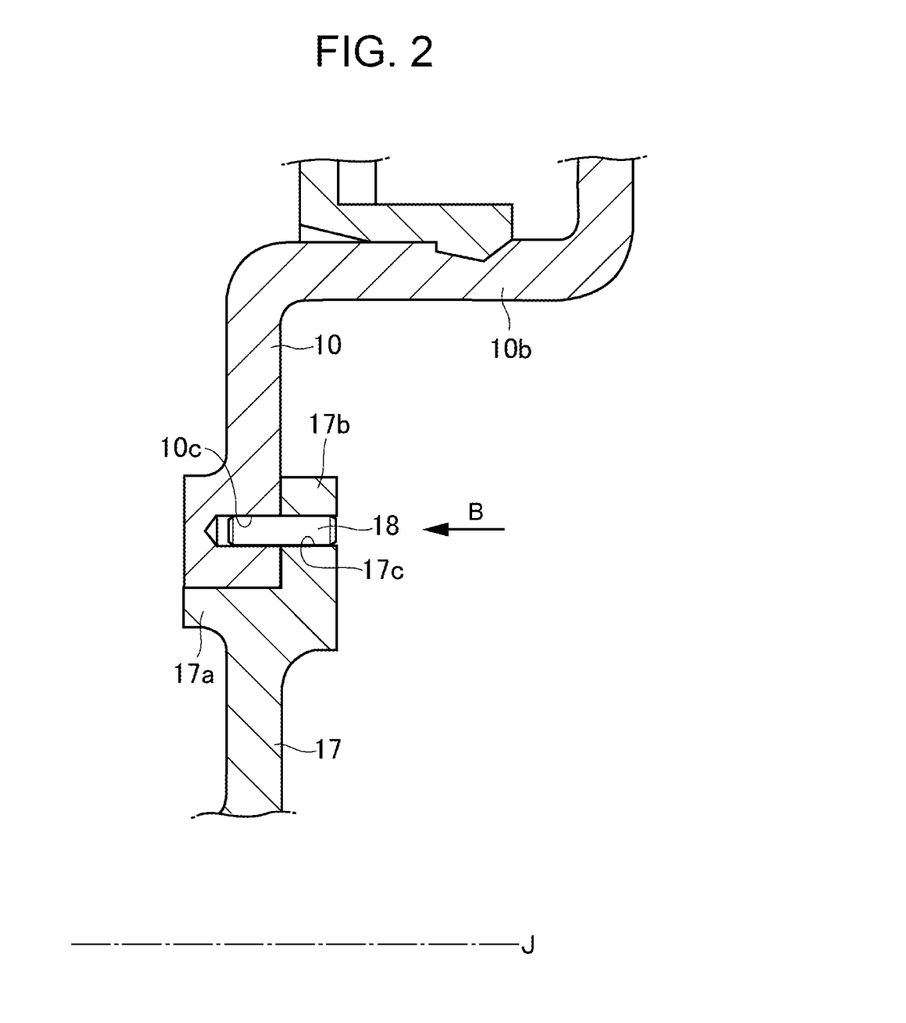
FIG. 2 is a partially enlarged cross-sectional view showing a cross-section of the in-wheel motor within a region A in FIG. 1 in an enlarged scale.

As illustrated in FIG. 2, an outer circumferential end of the connection member 17 has an L-shaped cross-section. Specifically, a thickness of an outer circumferential surface of the connection member 17 is widened to serve as a joint section 17*a* that is brought into contact with an inner circumferential surface of the rotor cover 10, and a connection wall 17*b* expands radially outwardly from an axially outer end of the joint section 17*a* to be brought into contact with an axially outer surface of the side wall section 10*b* of the rotor cover 10.

Figure 3:
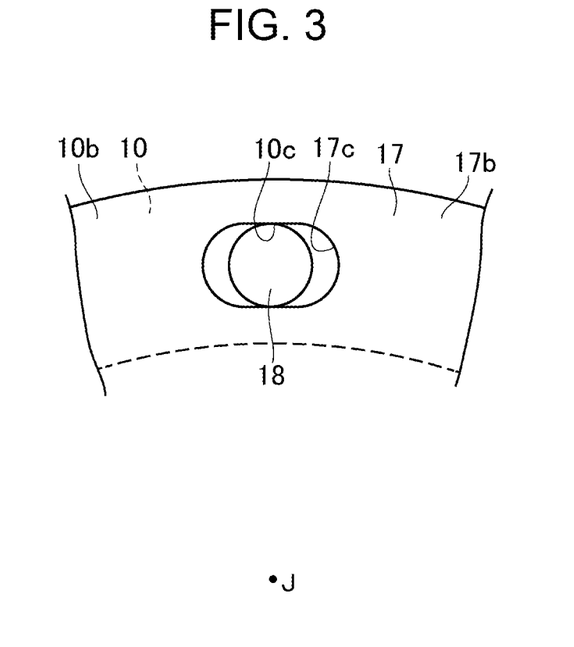
FIG. 3 is a front view showing a joining site between the drive member and the driven member viewed from the direction B indicated in FIG. 2.

An oval hole 17*c* is formed on the connection wall 17*b* of the connection member 17. Specifically, as illustrated in FIG. 3, the oval hole 17*c* is wider in the circumferential direction than the pinhole 10*c* formed on the side wall section 10*b* of the rotor cover 10. After joining the connection member 17 to the rotor cover 10, the oval hole 17*c* is overlapped with the pinhole 10*c*, and a dowel pin 18 as a transmission member is inserted into the pinhole 10*c* through the oval hole 17*c*. That is, according to the example illustrated in FIG. 3, predetermined clearances are maintained on both sides of the dowel pin 18 from the oval hole 17*c* in the rotational direction of the rotor 9. Thus, a joining site between the rotor cover 10 and the connection member 17 through the dowel pin 18 is situated radially inner side of the stator 6, and overlaps at least partially with the stator 6 in the axial direction.

In order to fix the connection member 17 to the rotor cover 10 at a plurality of sites by the dowel pins 18, a plurality of the pinholes 10c may be formed on the side wall section 10b of the rotor cover 10 at regular intervals in the circumferential direction, and a plurality of the oval hole 17c may be formed on the connection wall 17b of the connection member 17 at regular intervals in the circumferential direction. Optionally, a leading end of each of the dowel pins 18 may be swaged to firmly fix the connection member 17 to the rotor cover 10. Instead, the pinhole 10c may be formed into an oval hole, and the oval hole 17c may be formed into a circular hole.

In the in-wheel motor 1, a load derived from magnetic fluxes established by the energized coil 6e and the magnets 9a acts in a rotational direction of the rotor 9, and a torque is established in accordance with such load and a radius of the rotor 9. The torque thus established is delivered from the rotor 9 to the dowel pin 18 inserted into the pinhole 10c of the rotor cover 10. Consequently, the dowel pin 18 is brought into contact with one end of the oval hole 17c in the rotational direction of the rotor 9 so that the torque is further delivered to the connection member 17. That is, in the in-wheel motor 1, the torque of the rotor 9 is delivered to the wheel through the rotor cover 10, the dowel pin 18, and the connection member 17.

For example, when an extraordinary torque is applied to the in-wheel motor 1 generating a drive torque from the wheel due to abrupt change in a rotational speed of the wheel, a load derived from such extraordinary torque would be applied to the dowel pin 18. Likewise, when an extraordinary torque is generated in the in-wheel motor 1 due to failure of a controller (not shown) controlling a current supplied to the coil 6e, a load derived from such extraordinary torque would also be applied to the dowel pin 18.

In order to prevent transmission of such extraordinary torque, the dowel pin 18 is adapted to serve as a torque limiter. To this end, strength of the dowel pin 18 is set such that the dowel pin 18 will be broken when a torque greater than a predetermined upper limit torque is applied to the rotor cover 10 or the connection member 17. For example, the strength of the dowel pin 18 may be adjusted by selecting material having a desired strength to form the dowel pin 18, or adjusting a diameter of the dowel pin 18.

Thus, in the in-wheel motor 1 according to the first example, the rotor 9 is connected to the wheel by joining the rotor cover 10 to the connection member 17 through the dowel pin 18, and the strength of the dowel pin 18 is set such that the dowel pin 18 serves as a torque limiter. In the in-wheel motor 1 according to the first example, therefore, the dowel pin 18 will be broken when the extraordinary torque is applied to the rotor cover 10 or the connection member 17. In other words, the torque transmitted between the rotor cover 10 and the connection member 17 may be limited to a desired magnitude.

In addition, the dowel pin 18 as a torque limiter is situated in an output side of the rotor 9 as an outer rotor. In the in-wheel motor 1 according to the first example, therefore, a motor section generating a torque may be arranged concentrically with a transmission section transmitting the torque to the wheel. For this reason, an axial length of the in-wheel motor 1 may be reduced compared to an axial length of an inner rotor motor. Specifically, since the dowel pin 18 as a torque limiter connects the rotor cover 10 to the connection member 17 in the radially inner side of the stator 6, a space in the axial direction for arranging a torque limiter may be omitted.

Further, since the oval hole 17c of the connection member 17 has a predetermined width in the circumferential direction, a phase difference in the rotational direction between the rotor cover 10 and the connection member 17 may be tolerated when assembling. For this reason, the in-wheel motor 1 according to the first example may be assembled easily. In other words, a tolerance between positions of the pinhole 10c of the rotor cover 10 and the oval hole 17c of the connection member 17 may be increased. For this reason, machining errors of the rotor cover 10 and the connection member 17 may be tolerated to a certain extent, and hence a manufacturing cost of the in-wheel motor 1 may be reduced.

Figure 4:
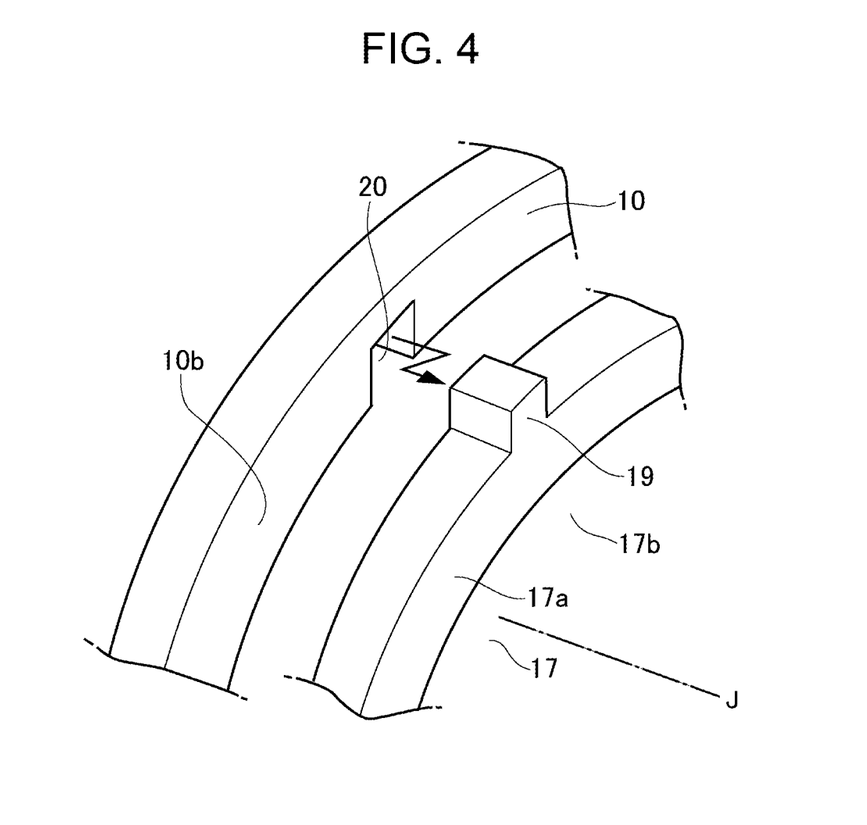
FIG. 4 is a partial perspective view showing the joining site between the drive member and the driven member according to a second example of the present disclosure.
Figure 5:
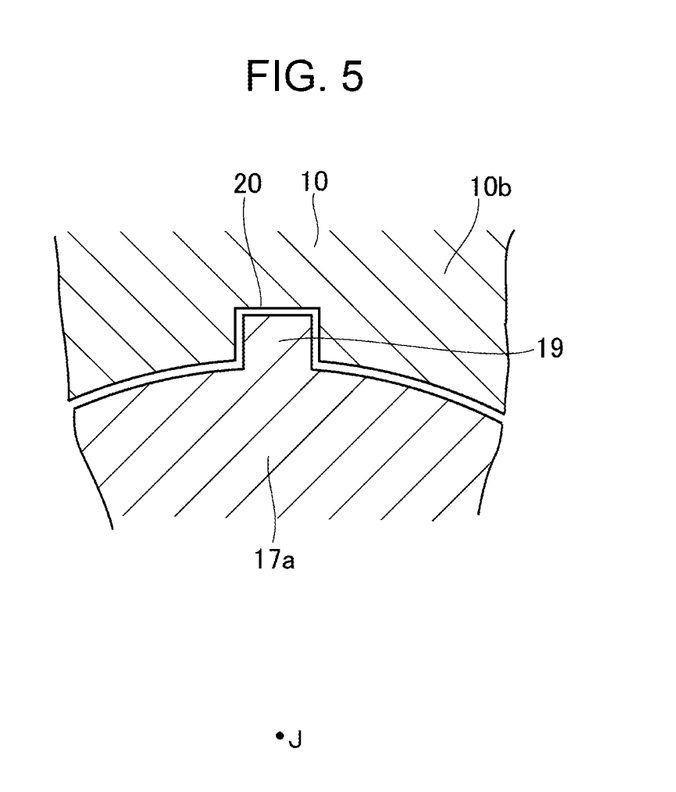
FIG. 5 is a cross-sectional view showing a cross-section of the joining site between the drive member and the driven member according to the second example of the present disclosure.

Here will be explained the second example of the in-wheel motor 1 according to the present disclosure with reference to FIGS. 4 and 5. According to the second example, the rotor cover 10 is joined to the connection member 17 by a different manner from the first example. According to the second example, specifically, a key 19 protruding radially outwardly is formed on the joint section 17a of the connection member 17 in the axial direction, and a keyway 20 that is wider than the key 19 in the circumferential direction is formed on the inner circumferential surface of the rotor cover 10. Thus, according to the second example, the rotor cover 10 is joined to the connection member 17 by fitting the key 19 of the connection member 17 into the keyway 20 of the rotor cover 10 so that the torque is transmitted between the rotor cover 10 and the connection member 17. That is, the key 19 serves as the transmission member.

According to the second example, the key 19 is adapted to serve as a torque limiter. To this end, strength of the key 19 is set such that the key 19 will be broken when the torque greater than the predetermined upper limit torque is applied to the rotor cover 10 or the connection member 17. For example, the strength of the key 19 may be adjusted by selecting material having a desired strength to form the key 19, or adjusting a width of the dowel pin 18.

Thus, in the in-wheel motor 1 according to the second example, the rotor 9 is connected to the wheel by joining the rotor cover 10 to the connection member 17 through the key 19, and the strength of the key 19 is set such that the key 19 will be broken when the extraordinary torque is applied to the rotor cover 10 or the connection member 17. According to the second example, therefore, the torque transmitted between the rotor cover 10 and the connection member 17 may also be limited to a desired magnitude.

In addition, since the key 19 as a torque limiter connects the rotor cover 10 to the connection member 17 in the radially inner side of the stator 6, a space in the axial direction for arranging a torque limiter may be omitted. That is, the in-wheel motor 1 according to the second example will not be enlarged by the torque limiter.

Further, since the keyway 20 of the rotor cover 10 is wider than the key 19 in the circumferential direction, a phase difference in the rotational direction between the rotor cover 10 and the connection member 17 may be tolerated when assembling. For this reason, the in-wheel motor 1 according to the second example may be assembled easily. In other words, a tolerance between positions of the keyway 20 of the rotor cover 10 and the key 19 of the connection member 17 may be increased. For this reason, machining errors of the rotor cover 10 and the connection member 17 may be tolerated to a certain extent, and hence a manufacturing cost of the in-wheel motor 1 may be reduced.

Thus, according to the first and second examples, the rotor cover 10 can be easily joined to the connection member 17. Nonetheless, when travelling on an uneven road surface such as a rocky road surface, in order to suppress a change in the driving force, it is necessary to reverse a direction of the torque of the rotor 9. However, according to the first and second examples, the torque generated by the rotor 9 may not be delivered promptly to the wheel after being reversed. Specifically, in the in-wheel motor 1 according to the first example, the torque of the rotor 9 is not transmitted to the wheel until the dowel pin 18 being contacted with one end of the oval hole 17*c* comes into contact with the other end of the oval hole 17*c*. Likewise, in the in-wheel motor 1 according to the second example, the torque of the rotor 9 is not transmitted to the wheel until the key 19 being contacted with one of end walls of the keyway 20 comes into contact with the other end wall of the keyway 20.

In order to promptly transmit the torque of the rotor 9 to the wheel when travelling on the uneven road surface, in the in-wheel motor 1 according to the first example, the oval hole 17*c* may also be shaped into a circular hole having a diameter substantially identical to that of the dowel pin 18. In this case, the dowel pin 18 is tightly contacted not only to the pinhole 10*c* but also to the oval hole 17*c* in the rotational direction of the rotor 9. Likewise, in the in-wheel motor 1 according to the second example, a width of the keyway 20 may also be adjusted substantially identical to a width of the key 19. In this case, the key 19 is contacted tightly to the keyway 20 in the rotational direction of the rotor 9.

As described, according to the foregoing examples, the dowel pin 18 and the key 19 serve as the torque limiters to be broken by the extraordinary torque applied thereto. Therefore, the torque will not be transmitted between the rotor 9 and the wheel after the dowel pin 18 or the key 19 is broken.

Figure 6:
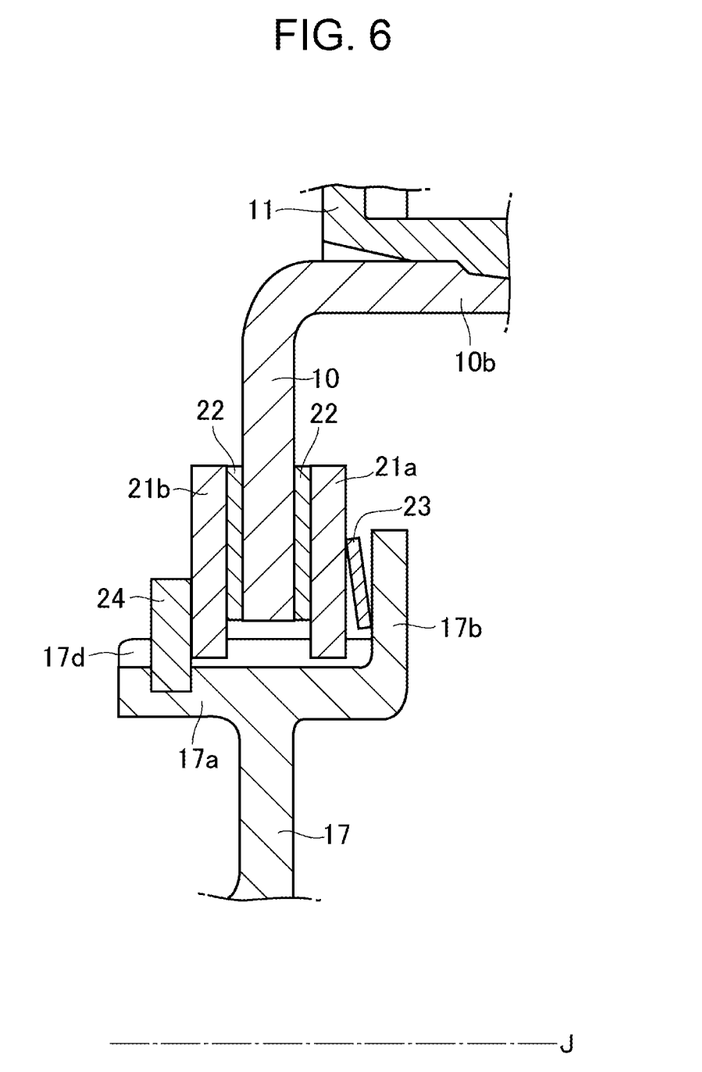
FIG. 6 is a cross-sectional view showing a cross-section of the joining site between the drive member and the driven member according to a third example of the present disclosure.

According to the third example of the present disclosure shown in FIG. 6, therefore, the in-wheel motor 1 is configured to continuously transmit the torque even after the torque transmission between the rotor cover 10 and the connection member 17 is temporarily interrupted by the extraordinary torque applied to the rotor 9 or the wheel.

In the in-wheel motor 1 shown in FIG. 6, the torque is transmitted frictionally between the rotor cover 10 and the connection member 17. To this end, in the connection member 17, a spline ridge 17*d* is formed on an outer circumferential surface of the joint section 17*a*, and annular plates 21*a* and 21*b* are splined onto the joint section 17*a* while being opposed to each other across the rotor cover 10.

On the other hand, in the rotor cover 10, annular friction members 22 are attached to both surfaces of the radially inner end of the side wall section 10*b*. The annular plates 21*a* and 21*b* are in contact with the friction members 22 from axially outer sides, and the annular plate 21*a* is pushed onto one of the friction members 22 by a disc spring 23 as an elastic member interposed between the connection wall 17*b* and the annular plate 21*a*. That is, in the in-wheel motor 1 shown in FIG. 6, the upper limit torque transmitted between the rotor cover 10 and the connection member 17 is governed by the disc spring 23. In other words, an elastic coefficient and a deformation amount of the disc spring 23 are adjusted to achieve a desired upper limit torque transmitted between the rotor cover 10 and the connection member 17.

The annular plate 21*b* being pushed by the disc spring 23 is supported by a snap ring 24 fitted onto the joint section 17*a* in the axially inner side of the annular plate 21*b*.

According to the third example, the rotor cover 10 may be joined to the connection member 17 without requiring to align positions of the rotor cover 10 and the connection member 17 in the rotational direction. According to the third example, therefore, the rotor cover 10 may be joined easily to the connection member 17.

In the in-wheel motor 1 according to the third example, the rotor cover 10 and the connection member 17 will be rotated relatively to each other while slipping by an extraordinary torque greater than the upper limit torque that is applied to the rotor cover 10 or the connection member 17. In the in-wheel motor 1 according to the third example, therefore, such extraordinary torque will not be applied to the rotor 9 or the wheel. Thus, according to the third example, the joining site between the rotor cover 10 and the connection member 17 through the friction members 22 serves as a torque limiter. When the torque applied to the rotor cover 10 or the connection member 17 decreases to the upper limit torque, the rotor cover 10 and the connection member 17 starts rotating integrally again while transmitting the torque within the upper limit torque. According to the third example of the present disclosure, therefore, it is not necessary to replace the in-wheel motor 1 even after the actuation of the torque limiter.

Instead, the annular plates 21*a* and 21*b* may also be attached to the rotor cover 10 to be rotated integrally therewith on both sides of the radially outer end of the connection member 17 in the axial direction. Further, in the in-wheel motor 1 according to the first example, the dowel pin 18 may be omitted to frictionally transmit the torque between the rotor cover 10 and the connection member 17. In this case, the inner circumferential surface of the side wall section 10*b* of the rotor cover 10 and the outer circumferential surface of the joint section 17*a* of the connection member 17 are contacted tightly with each other through a friction member attached to at least one of those contact surfaces.

What is claimed is:

1. An in-wheel motor in which an outer-rotor type motor is arranged in a wheel of a vehicle and in which a flange of a support shaft rotated by a torque delivered from the outer-rotor type motor is connected to the wheel, comprising:
a cylindrical stator;
a cylindrical rotor that is arranged around the stator while maintaining a predetermined clearance from an outer circumferential surface of the stator;
a rotor cover that covers an outer circumference of the outer-rotor type motor;
a connection member that connects the rotor cover to the wheel; and
a torque limiter configured to limit a torque transmitted between the rotor cover and the connection member, wherein
the rotor cover comprises:
a cylindrical section in which the rotor is fitted onto an inner circumferential surface, and
a side wall section that extends radially inwardly from an end portion of the cylindrical section at an outboard side in a width direction of the vehicle, bends toward an inboard side at a radially inner side of the stator, and further extends radially inwardly,
the connection member has an annular plate-like shape, and comprises an inner circumferential section fixed to the flange of the support shaft and an outer circumferential section joined to a radially inner end of the side wall section, the torque limiter comprises a key formed integrally with the outer circumferential section of the connection member in an axial direction while protruding radially outwardly from the outer circumferential section, and a keyway formed in the radially inner end of the side wall section of the rotor cover at a position corresponding to the key of the connection member, and the key is adapted to limit the torque transmitted between the rotor cover and the connection member by being broken.

2. The in-wheel motor as claimed in claim 1, wherein the key of the connection member is narrower than the keyway of the side wall section of the rotor cover in a rotational direction of the connection member.

3. The in-wheel motor as claimed in claim 1, wherein the in-wheel motor further comprises a sealing member engaged with a radially outer surface of the side wall section of the rotor cover at a radially inner side of the stator, and configured to seal a clearance between the stator and the radially outer surface of the side wall section of the rotor cover.

\* \* \* \* \*